(12) United States Patent
Duncan

(10) Patent No.: US 6,659,552 B2
(45) Date of Patent: Dec. 9, 2003

(54) INFLATABLE AIRCRAFT SEAT CUSHION

(76) Inventor: Robert R. Duncan, P.O. Box 190746, Anchorage, AK (US) 99519-0746

( * ) Notice: Subject to any disclaimer, the term of this patent is extended or adjusted under 35 U.S.C. 154(b) by 33 days.

(21) Appl. No.: 10/047,043

(22) Filed: Jan. 14, 2002

(65) Prior Publication Data

US 2002/0125758 A1 Sep. 12, 2002

Related U.S. Application Data

(60) Provisional application No. 60/274,568, filed on Mar. 8, 2001.

(51) Int. Cl.$^7$ ................................................ A47C 7/02
(52) U.S. Cl. .............................. 297/230.1; 297/452.41; 297/DIG. 3
(58) Field of Search .................... 297/452.41, 230.1, 297/230.13, DIG. 3; 5/645, 655.3, 654, 644

(56) References Cited

U.S. PATENT DOCUMENTS

| | | | | |
|---|---|---|---|---|
| 1,222,175 A | * | 4/1917 | Bobrick | |
| 2,612,645 A | * | 10/1952 | Boland | |
| 2,644,449 A | | 7/1953 | Champagne | 128/118 |
| 3,680,917 A | * | 8/1972 | Harris | |
| 3,883,173 A | | 5/1975 | Shephard et al. | 294/312 |
| 4,105,249 A | | 8/1978 | Van Vliet, Jr. | 297/230 |
| 4,629,162 A | | 12/1986 | Porche | 254/93 |
| 4,862,536 A | | 9/1989 | Pruit | 5/432 |
| 5,303,977 A | * | 4/1994 | Sereboff | |
| 5,432,967 A | | 7/1995 | Raftery | 5/633 |
| 5,548,948 A | * | 8/1996 | Smith et al. | |
| 5,836,653 A | | 11/1998 | Albecker | 297/452.31 |
| 6,010,192 A | | 1/2000 | King | 297/397 |
| 6,478,380 B2 | * | 11/2002 | Ehrlich | |

* cited by examiner

Primary Examiner—Milton Nelson, Jr.
(74) Attorney, Agent, or Firm—Dean A. Craine

(57) ABSTRACT

A portable aircraft cushion that may be selectively used by passengers seated in standard aircraft seats to provide greater back, head, and neck support so that the passengers may sleep easier. In the preferred embodiment, the cushion comprises a lower body support section made of a plurality of transversely aligned, interconnected air chambers which are filled with air using a supplied pump or the aircraft air ventilation system. When inflated, the top air chambers in the body support section are positioned approximately level with the top edge of the seat when fully reclined. Located above the body support section is an inflatable head and neck support section that extends above the top edge of the seat when inflated to support the user's head and neck. In the preferred embodiment, the head and neck section comprises two lateral support chambers separated by non-inflating webbing material. During use, the body support section and the head and neck sections are integrally formed so that when the passenger slowly sits back on the cushion, air initially placed in the cushion is forced upward around the passenger's body and his or her neck and head.

7 Claims, 5 Drawing Sheets

INFLATABLE AIRCRAFT SEAT CUSHION

This is a utility patent application based on a provisional patent application (Ser. No. 60/274,568) filed on Mar. 8, 2001.

BACKGROUND OF THE INVENTION

1. Field of the Invention

This invention pertains to inflatable back and neck supports and, more particularly, to back and neck supports designed to be used with reclining seats.

2. Description of the Related Art

Airplane passengers sit in back supported seats arranged in rows in an aircraft. While these seats are relatively comfortable for short periods, they often become uncomfortable after long periods because of their limited reclining angles and the small amount of space between the rows of seats. When a passenger stretches out in the seat and tries to find a more comfortable position for sleeping, the passenger's lumbar back region is not supported which may create lower back discomfort. Also, the passenger's head and neck are not supported, which results in the head rotating forward and laterally when the aircraft flies into small air turbulence. Such head movement, of course, awakens the passenger, or may prevent him or her from sleeping altogether.

Not every passenger wants to sleep on the aircraft, of course. Also, most airlines do not want to change the style of seats or the spacing of rows to better accommodate sleeping passengers.

What is needed is a portable, back and neck support cushion that can be selectively used with standard passenger aircraft seats with limited row spacing that positions and supports passengers in a more comfortable sleeping position when flying.

SUMMARY OF THE INVENTION

It is an object of the present invention to provide a back, head, and neck support cushion for passengers sitting in an upright or reclining aircraft seat.

It is another object of the invention to provide such a cushion that is portable and selectively inflated and deflated by passengers.

It is a further object of the invention to provide such a cushion that connects to an aircraft ventilation system for inflating.

These and other objects of the invention that will become apparent are met by a wedge-shaped, inflatable back and neck support cushion designed specifically for use on a standard coach-style airline passenger seat which, during use, supports the user's back, head, and neck. The cushion is a five-sided, oblique polyhedron with a rectangular front surface, a rectangular back surface, a rectangular base surface, and two opposite, obtuse triangle side walls. The side walls are parallel and perpendicularly aligned with the adjacent front, back and base surfaces. The widths of the front and back surfaces are slightly smaller than the width of a standard "coach-style" airline passenger seat. The length of the front surface and the two side walls is approximately equal to the height of a standard "coach-style" airline passenger seat.

In order to be used on an upright or reclined "coach-style" airline passenger seat, the cushion must be wedge-shaped with specific interior angles between the front, base, and rear surfaces. In the preferred embodiment, the interior angle between the front surface and the base surface is approximately 48 degrees while the interior angle between the back surface and the base surface is approximately 105 degrees. The interior angle between the back surface and the front surface is approximately 27 degrees.

In the first embodiment, the cushion comprises a lower body support section and an upper head and neck support section. In the first embodiment, the body support section is made of a plurality of transversely aligned air chambers that are selectively filled with air using an inflation means. Air passageways are formed between adjacent air chambers so that air may be evenly distributed throughout. The upper region of the body support section is sufficient in height so that the upper air chamber is approximately 12 inches below the top edge of the seat when the seat is fully reclined. Also in the first embodiment, an optional, transversely aligned opening, called a barrel, is formed in the middle region of the body support section, which prevents the side walls from bulging outward and pressing against an adjacent passenger.

The head and neck support section is attached to the upper region of the body support section and is designed to extend above the lower body support section when inflated or extend under the upper region of the body support section when not inflated. In a second embodiment, the cushion is also wedge-shaped with a lower body support section made of one or two large air chambers that are integrally formed with the upper head and neck section. In both embodiments, the head and neck support section comprises two inflatable, lateral support chambers separated by a centrally aligned, non-inflating webbing material. A conduit is created between the support chambers that evenly distributes air therebetween when the user places his or her head on the webbing material.

During use, the seat is reclined and the cushion is aligned longitudinally over the seat. The body support section is placed over the seat while the upper head and neck section is placed over the upper portion of the back section or folded under the body support section. The seal may be in an upright or reclined position. The cushion is partially inflated using the aircraft ventilation system, by manually breathing into the valve, or by using an optional hand pump. The passenger then sits down in the seat and slowly lays back, forcing the air in the body support section outward and upward so that the air is evenly distributed throughout the entire cushion, conforming in shape and size to the passenger's body. Simultaneously, the passenger positions his or her head centrally over the webbing material so that the two lateral support chambers move forward and laterally and apply slight pressure against the sides of the neck and head thereby maintaining the head in a forward facing direction. The passenger may selectively add or remove air from the cushion to obtain optimal support and comfort.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Figure 1:
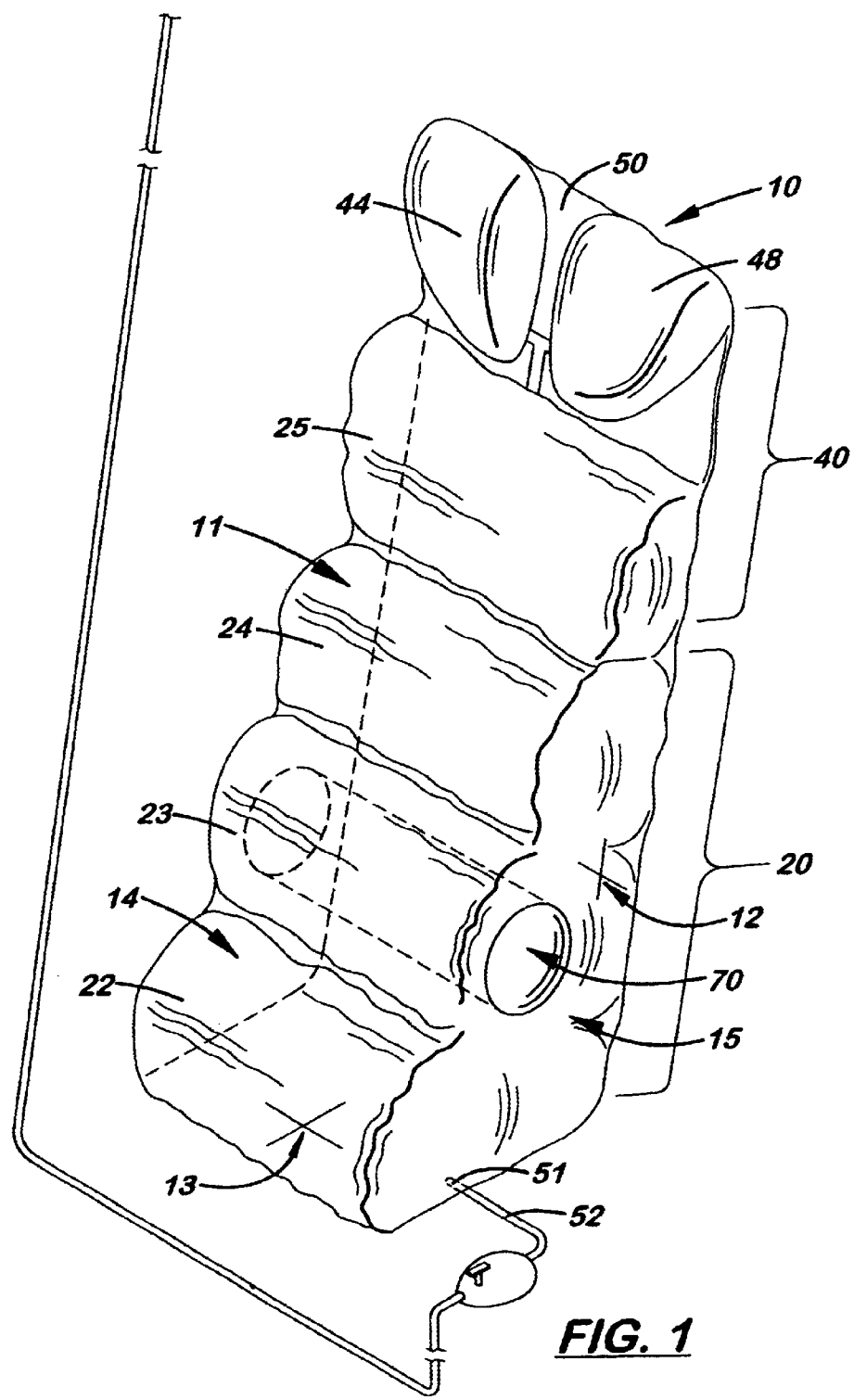
FIG. 1 is a perspective view of the first embodiment of the inflatable aircraft seat cushion disclosed herein.
Figure 2:
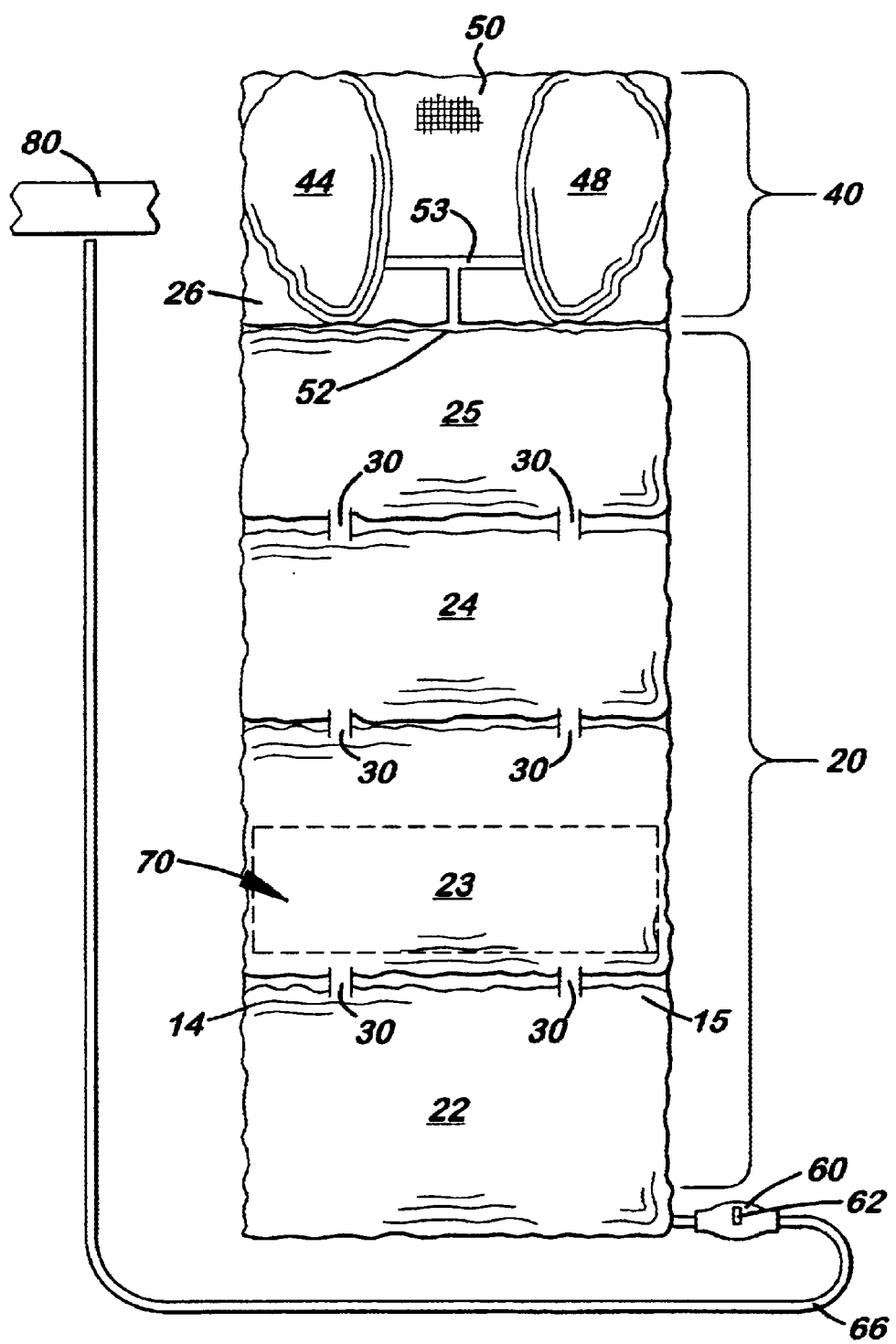
FIG. 2 is a front elevational view of the cushion.

Referring to the accompanying FIGS., there is shown and described a wedge-shaped inflatable back and neck support cushion 10 designed specifically for use on a standard passenger aircraft seat 90 which, during use, supports the user's back, head and neck. The cushion 10 is a wedge-shaped, five-sided polyhedron with a rectangular front surface 11, a rectangular back surface 12, a rectangular base surface 13, and a two opposite obtuse triangle side walls 14, 15. The side walls 14, 15 are parallel and perpendicularly aligned with the adjacent front, back and base surfaces 11, 12, 13. The widths of the front and back surfaces 11, 12, respectively, are slightly smaller than the width of a standard "coach-style" airline passenger seat 90. The lengths of the front surface 11 and the two side walls 14, 15 are approximately equal to the height of a standard "coach-style" airline passenger seat 90. The interior angle between the front surface 11 and the base surface 13 is approximately 48 degrees while the interior angle between the back surface 12 and the two side walls 14, 15 is approximately 105 degrees. The interior angle between the back surface 12 and the front surface 11 is approximately 37 degrees.

In the first embodiment shown in FIGS. 1, 2, 4, and 5, the cushion 10 includes a lower body support section 20 and an upper head and neck support section 40. The lower body support section 20 is made of four transversely aligned air chambers 22–25 that are selectively filled with air using an inflation means. A conduit 52 is attached to one air chamber 22, and passageways 30 are provided between adjacent air chambers 22–25 so that air is evenly distributed throughout all of the air chambers 22–25. The cushion 10 is designed so that the upper edge 26 of the upper air chamber 25 is approximately 2 to 3 inches below the top edge 95 of the back of the seat 90 when fully reclined. In the first embodiment, an optional, transversely aligned, fully extending passageway, called a barrel 70, is formed in the second air chamber 23, which prevents the side walls 14, 15 from bulging outward when inflated.

Figure 5:
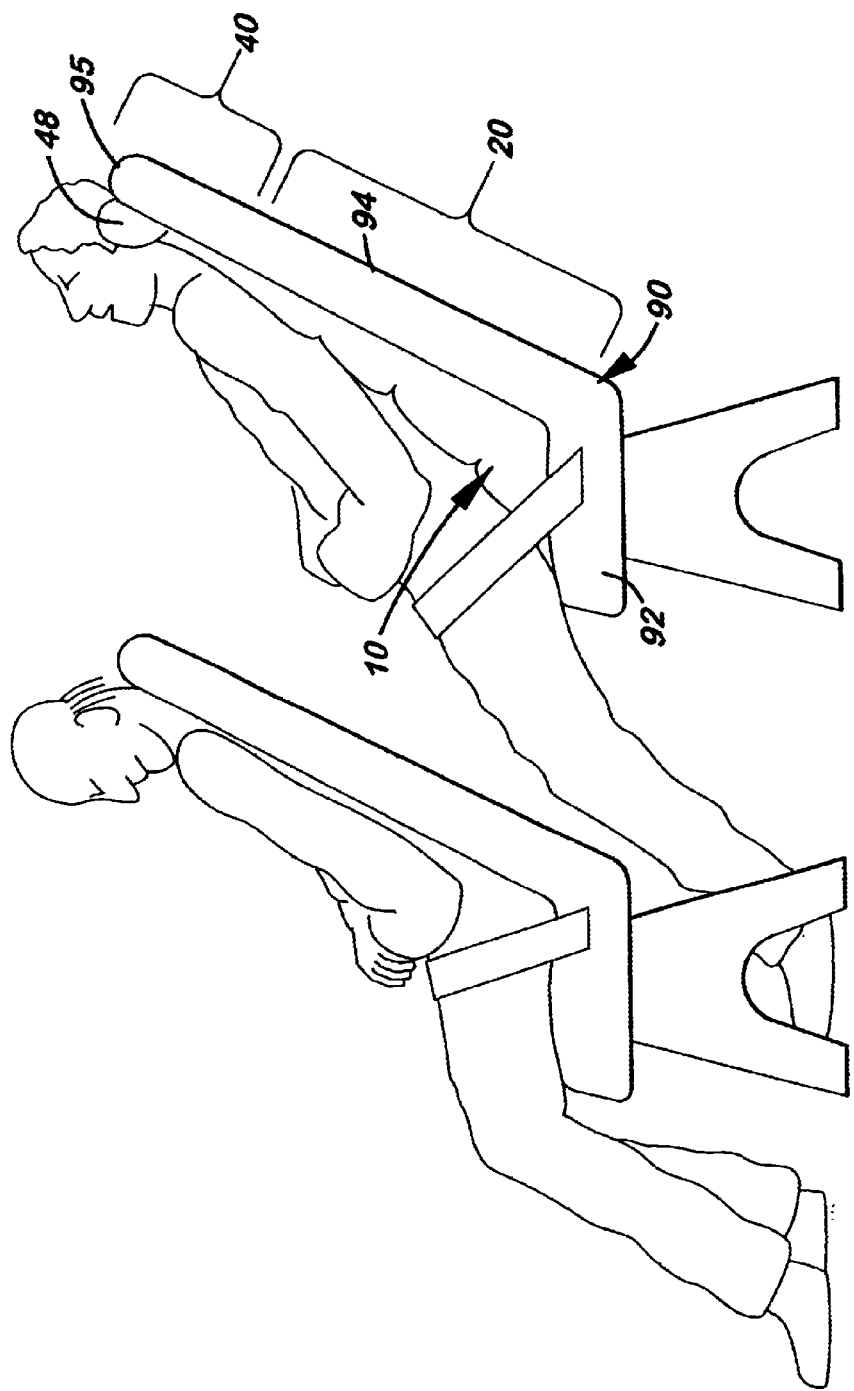
FIG. 5 is a left side elevational view of the first embodiment of the inflatable cushion being used on an aircraft seat.

The upper head and neck support section 40 is attached to the upper edge 26 of the lower body support section 20 and is designed so that its upper edge is approximately level or slightly above the top edge 95 of the back section 94 of the seat 90 when inflated, as shown in FIG. 5. In the preferred embodiment, the head and neck support section 40 comprises two inflatable, lateral support chambers 44, 48 separated by a flexible, central, non-inflating webbing material 50. In the preferred embodiment, the webbing material 50 acts as a flexible, intermediate member thereby enabling the upper head and neck section 40 to be folded under the body support section 20, if desired. A longitudinally aligned conduit 52 is formed in the webbing material 50 to transmit air from the upper air chamber 25 on the body support section 20 to a transversely aligned conduit 53 that communicates with the two lateral support chambers 44, 48.

Figure 3:
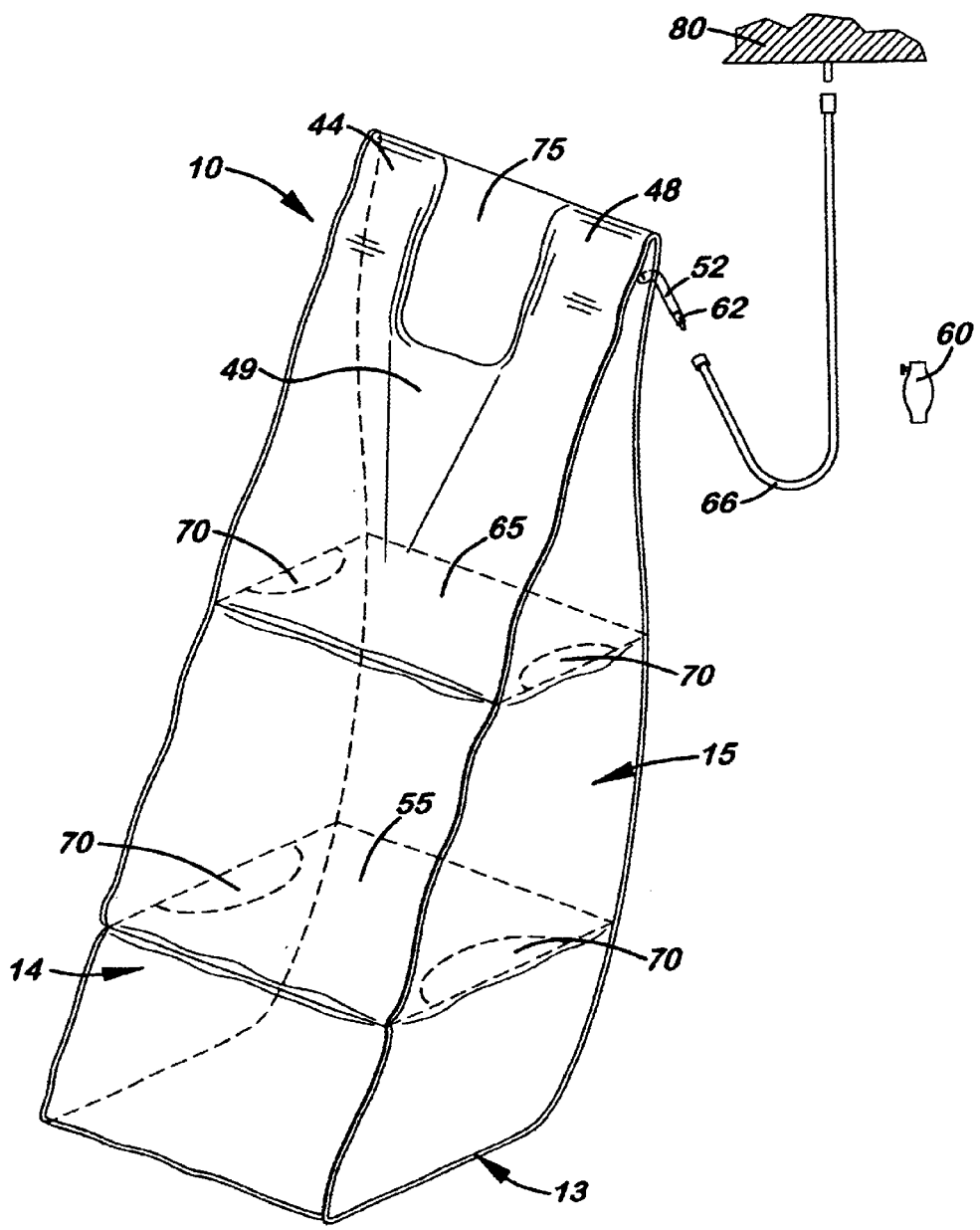
FIG. 3 is a perspective view of a second embodiment of the inflatable seat cushion.
Figure 4:
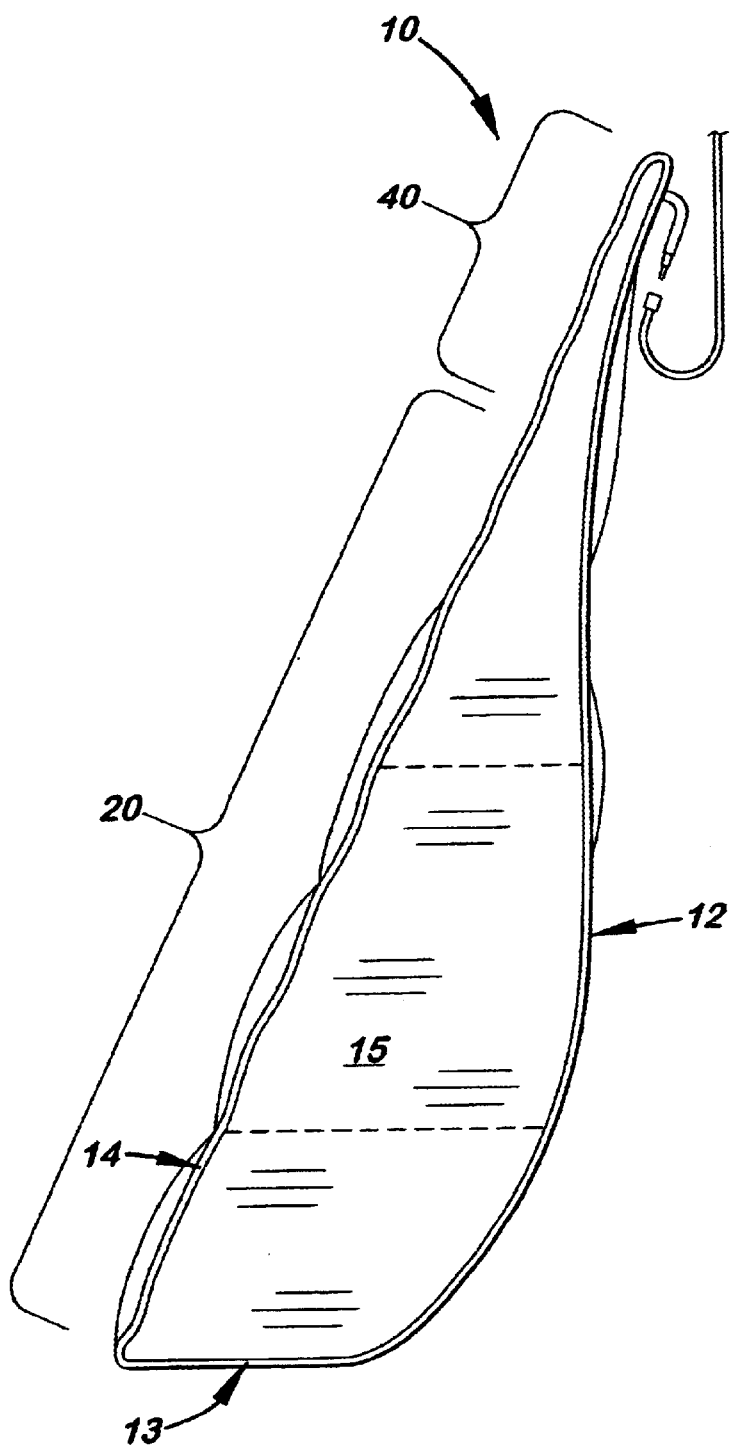
FIG. 4 is a left side elevational view of the first embodiment.

In a second embodiment, shown in FIGS. 3, the cushion 10 also includes a lower body support section 20 and an upper head and neck support section 40. The lower body support section 20 is made of one large, wedge-shaped chamber with one or more optional dividing walls 55, 65 extending from the inside surfaces of the front and rear surfaces 11, 12. Air passages 70 are formed between the dividing walls 55, 65 so that air may be evenly distributed throughout the cushion 10.

The upper head and neck support section 40 includes two lateral supporting air chambers 44, 48 separated by a non-inflating U-shaped webbing material 75. During use, the webbing material 75 remains flat against the top of the seat back while the two lateral supporting air chambers 44, 48 and the intermediate section 49 are inflated.

In both embodiments, when measured across the front surface 11 and including the head and neck support section 40, the cushion 10 measures overall 38 inches in length and 19 inches in width when inflated. When measured across the back surface 12, the cushion 10 measures approximately 35 inches in length and 17 inches in width. The front surface 11 of the lower body support section 20 measures approximately 26 inches in length and 17 inches in width. The base surface 13 measures approximately 10 inches in length and 17 inches in width. The upper head and neck section 40 measures approximately 12 inches in height and 17 inches in width. The two lateral supporting air chambers 44, 48 each measure approximately 12 inches in height and 6 inches in width. The webbing material 50 is approximately 5–12 inches in width and 9 inches in length so that the sides of the head and neck are in contact with the cushion 10. The surfaces 11–15 are made of flexible, lightweight vinyl material which is radio frequency welded together to form an airtight structure. Such material can be easily folded and stored in the user's carry-on bag.

As shown in FIG. 5, during use, the back section 94 of the seat 90 is reclined and the cushion 10 is aligned longitudinally over the seat section 92. The air chambers 22–25 and lateral support chambers 44, 48 are partially inflated by exhaled air (10–25 breaths), a manual hand pump 60, or the aircraft ventilation system 80. The base surface 13 is placed on the seat section 92 while the back surface 12 is placed over the back section 94 of the seat 90. The passenger then sits down in the seat 90 and slowly lays back forcing the air in the body support section 20 outward and upward so that the air chambers 22–25 in the lower body support section 20 conform their shape and size to the passenger's body. Simultaneously, the passenger positions his or her head over the webbing material 50 on the upper head and neck support section 40. As the passenger sits back into the cushion 10, air is forced upward and forward thereby causing the cushion 10 to wrap around the passenger, and causing the two lateral support chambers 44, 48 to inflate and support the sides of the neck and head. The intermediate section 49 of the cushion directly below the webbing material 50 also is inflated and extends forward to support the passenger's neck.

The air inflation means may be a short conduit 52 attached to an air inlet port 51 formed on one air chamber 48 with a manually operated, dual directional control valve 62 attached at its opposite end that enables the user to inflate the cushion 10 by his or her breath. The end of the short conduit 52 may be attached to a hand pump 60 or to a long conduit 66 that attaches to the aircraft ventilation system 80.

In compliance with the statute, the invention described herein has been described in language more or less specific as to structural features. It should be understood, however, that the invention is not limited to the embodiments described herein or to specific features shown, since the means and constriction shown, comprised only of the preferred embodiments for putting the invention into effect. It is also understood that the phraseology and terminology employed herein are for the purpose of description and should not be regarded as limiting. The invention is therefore claimed in any of its forms or modifications within the legitimate and valid scope of die amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

I claim:

1. An inflatable aircraft cushion, comprising:
   a. an inflatable, wedge-shaped lower body support section, said lower body section being a five-sided polygon capable of being longitudinally aligned on an aircraft seat, said lower body support section having a height approximately equal to an aircraft seat and having obtuse triangular side walls;
   b. an inflatable head and neck support section attached to said lower body support section, said head and neck support section including two opposite, inflatable lateral members and a central, non-inflatable webbing material, said lateral members when inflated support a user's head and neck in a forward-facing direction when placed on said webbing material;
   c. an air inlet port enabling air to enter and exit said lower body support section and said head and neck support section; and,
   d. a valve connected to said air inlet port enabling said air inlet port.

2. The aircraft cushion, as recited in claim 1, further including a hollow, transversely aligned barrel located inside said lower body support section.

3. The aircraft cushion, as recited in claim 1, wherein said lower body support section includes one or more internal walls extending between said front and back surfaces of said cushion to maintain a wedge shape.

4. The aircraft cushion, as recited in claim 1, wherein said lower body support section is an oblique polygon with internal angles that measure 27, 48, and 105 degrees.

5. The aircraft cushion, as recited in claim 1, wherein said cushion measures 38 inches in height, 19 inches in width, and 10 inches in depth.

6. The aircraft cushion, as recited in claim 1, further including means to connect said air inlet port to a ventilation system in an aircraft.

7. The aircraft cushion, as recited in claim 1, wherein said lower body support section and said head and neck section is one large chamber.

* * * * *